United States Patent Office 3,470,002
Patented Sept. 30, 1969

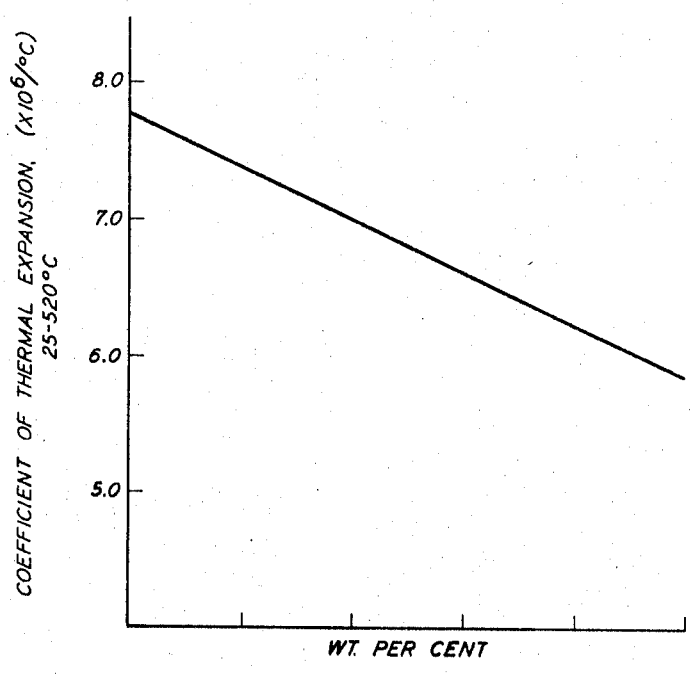

3,470,002
GLAZE FOR HIGH DENSITY ALUMINA
Frank V. Di Marcello, Plainfield, and Arnold W. Treptow, Fanwood, N.J., assignors to Bell Telephone Laboratories, Incorporated, Murray Hill, N.J., a corporation of New York
Filed Jan. 30, 1967, Ser. No. 612,377
Int. Cl. C03c 5/00; C04b 33/26
U.S. Cl. 106—49                5 Claims

ABSTRACT OF THE DISCLOSURE

A ceramic substrate glaze which is of particular interest for use upon high density alumina substrates includes an oxide mixture containing $Al_2O_3$, $SiO_2$, BaO, PBO, $Bi_2O_3$, $TiO_2$, $K_2O$, $As_2O_3$ and either CaO or $B_2O_3$. The thermal coefficient of expansion of the glaze may be altered for the purpose of matching that of the substrate member by varying the ratio of $B_2O_3$ to CaO.

---

This invention relates to a ceramic substrate glaze. More particularly, the present invention relates to a multicomponent oxide glaze of particular interest for high density alumina ceramic substrates and to a technique for the preparation thereof.

In recent years, considerable interest has been generated in the electronics industry in integrated circuitry wherein thin films are deposited upon insulating substrates and subsequently fabricated into resistors, capacitors and interconnections. Studies of the electrical performance of such circuitry have focused the attention of workers in the art upon the substrate surfaces and have resulted in the imposition of stringent requirements thereon. Among the more promising materials in widespread use for this purpose are high density alumina ceramics, typically coated with a ceramic glaze. Unfortunately, the commercially available glazes utilized for this purpose are not completely satisfactory in that they vary with respect to chemical stability to electrolytes employed in thin film anodization, so resulting in adulteration of the anodizing bath and the concomitant limitation of voltage capability of the ultimate structure.

In accordance with the present invention, a technique is described for the preparation of a novel ceramic glaze comprising a mixture of oxides including $Al_2O_3$, $SiO_2$, CaO, BaO, $B_2O_3$, PbO, $Bi_2O_3$, $TiO_2$, $K_2O$, and $As_2O_3$ in specific proportions. The resultant composition has been found superior to prior art glazes in that it is essentially inert to anodization media, so enhancing voltage capability of the ultimate structure, and evidences superior insulation resistance. Additionally, studies have revealed that the thermal expansion coefficient of the glaze may be varied as to substantially match that of a high density alumina substrate by varying the ratio of calcium oxide to boron oxide.

The invention will be more fully understood by reference to the following detailed description taken in conjunction with the accompanying drawing, wherein:

The figure is a graphical representation on coordinates of weight percent $B_2O_3$=CaO against coefficient of thermal expansion ($\times 10^6$ per ° C.) showing variations in the latter parameter as a function of composition.

A general outline of a method suitable for use in preparing compositions of the present invention is set forth below. Certain operating parameters and ranges of starting materials are indicated.

As indicated above, the compositions of interest are multicomponent oxide systems. In order to obtain the most satisfactory glaze, it has been found essential to employ $Al_2O_3$, $SiO_2$, CaO, BaO, $B_2O_3$, PbO, $Bi_2O_3$, $TiO_2$, $K_2O$, and $As_{23}$. However, specific thermal expansion coefficients may be obtained by varying the ratio of CaO to $B_2O_3$ from 0–10 weight percent based upon a total of 10 weight percent so that either may be omitted. Practical considerations dictate the use of $Al_2O_3$, $SiO_2$, PbO, $TiO_2$, and $As_2O_3$ directly in the oxide form, whereas CaO, BaO and $K_2O$ are employed in the carbonate form. The $B_2O_3$ is initially introduced into the mixture in the acid form and the $Bi_2O_3$ in the hydrate form, $Bi(NO_3)_3 \cdot 5H_2O$.

Initially, the materials to be employed in preparing the novel glaze are obtained from commercial sources, reagent grade materials being satisfactory for the purposes of the invention. The materials so obtained are weighed and thoroughly mixed in order to obtain a uniform and homogeneous mixture. The complexity of the described system and the dependency of the effects among the consituents necessitate specific quantitative ranges for each component. Thus, it has been found necessary to adhere to the following schedule as set forth in Table I below:

TABLE I

| Constituent: | Weight percent range based upon total composition |
|---|---|
| $Al_2O_3$ | 4–10 |
| $SiO_2$ | 38–43 |
| CaO | 0–10 |
| BaO | 5–18 |
| $B_2O_3$ | 0–10 |
| PbO | 13–22 |
| $Bi_2O_3$ | 5–15 |
| $TiO_2$ | 0.5–2 |
| $K_2O$ | 0.5–2 |
| $As_2O_3$ | 0.25–1 |

The minima and maxima as expressed in Table I are determined by the following considerations:

$Al_2O_3$—The use of less than 4 weight percent leads to devitrification whereas an excess beyond 10 weight percent results in undesirable viscosity and firing temperature increases.

$SiO_2$—The use of less than 38 weight percent adversely affects acid resistance whereas the use of more than 43 weight percent results in undesirably high viscosity and firing temperatures.

CaO—As indicated, calcia may be varied from 0–10 weight percent to provide an expansion behavior compatible with high alumina ceramic compositions. The use of greater than 10 weight percent, however, increases the tendency toward phase separation of the composition.

BaO—Baria is a primary component of the novel glaze system and permits lowering of the lead content, thereby reducing lead loss by volatilization during the firing step. The use of less than 5 weight percent necessitates the use of such large quantities of PbO to produce equivalent fluxing that the ultimate composition is unacceptable because of its increased volatilization at the firing temperature. The use of greater than 18 weight percent essentially eliminates the effectiveness thereof as a flux.

$B_2O_3$—As indicated, this component may be varied from 0–10 weight percent to provide an expansion behavior compatible with high alumina ceramic compositions. The use of greater than 10 weight percent adversely affects the acid resistance of the glaze.

PbO—Lead oxide is a primary component of the system which functions as a flux upon $SiO_2$ and promotes wetting and high gloss. The use of less than 13 weight percent results in a loss in wetting behavior, whereas the use of greater than 22 weight percent results in undesirable volatilization of lead during firing.

$Bi_2O_3$—This component functions as a supplement to the lead oxide. Its presence enhances chemical stability of the glaze, increases thermal conductivity relative to PbO, lowers the viscosity of the composition and improves the wetting ability of the glaze. The use of less than the noted minimum adversely affects the chemical stability of the glaze, the maximum being determined primarily by economic considerations. However, appreciable excesses beyond 15 weight percent tend toward phase separation.

$TiO_2$—This component promotes acid resistance and chemical durability. The use of less than 0.5 weight percent results in a decrease in acid resistance, whereas excesses beyond 2 weight percent tend toward phase separation.

$K_2O$—This component is a primary flux that promotes fluidity without objectionable degradation of electrical insulation resistance below 2 weight percent. However, 0.5 weight percent is considered a practical minimum since the glaze becomes less fluid at the firing temperature.

$As_2O_3$—The use of less than 0.25 weight percent results in the formation of a grayish colored glaze due to reduction of $Bi_2O_3$. The use of greater than 1 weight percent serves no further purpose in preventing the reduction of the glaze and increases the toxicity hazard because of its volatility.

The mixture of components in the proper proportions is added to a suitable crucible and fired at a temperature ranging from 1350 to 1450° C. for a time period sufficient to produce a fluid melt. The molten glaze solution is then poured into a vessel containing cold water, shattered into small pieces and ground to a powder by conventional techniques. The particle size of the resultant powder is not critical, however practical considerations dictate a general preference for particles of the order of 0.002 inch in diameter or small enough to pass through a 200 mesh screen. Certain deposition procedures necessitate further grinding to produce particles capable of passing through finer screens. Then the powder is stored until ready for application to a substrate surface.

The present invention is primarily directed toward glazes utilized upon high density alumina substrates which, for purposes of the invention, are defined as compositions containing at least 85 percent, by weight, aluminum oxide. The novel glazes described herein may be applied to the substrate surface by any conventional technique, as, for example, by spraying as a wet spray in combination with a binder, in dry form, as a pre-formed transfer tape, and so forth.

Subsequent to the application of the glaze, it is permitted to dry in air and fired. Heating is continued until a temperature within the range of 1000–1250° C. is attained, such being dependent upon the maturation temperature of the composition of interest. It has been found for purposes of the present invention that it is desirable to employ a glaze thickness within the range of 0.0008 to 0.0016 inch which corresponds in weight with the range of 40–80 milligrams per square inch. It has been found that the use of thicknesses appreciably greater than the noted maximum preclude total elimination of occluded gases unless the temperature is raised to a point sufficiently high enough to create a fluid glaze. Unfortunately, such fluidity creates a meniscus around the edges of the glaze and causes a lack of uniformity therein.

Examples of the application of the present invention are set forth below. They are intended merely as illustrations, and it is to be appreciated that the processes described may be varied by one skilled in the art without departing from the spirit and scope of the present invention.

The examples are in tabular form for convenience and brevity. Each set of data in the tables is to be considered as a separate example since each set of data was obtained in a separate process. The procedure employed in each of the examples was as follows:

A mixture of the starting materials in the amounts indicated in Table II was weighed and thoroughly mixed to obtain a uniform and homogeneous mixture. Thereafter, the mixture was added to a platinum crucible which was placed in a suitable furnace and permitted to attain a temperature of 1400° C., at which point a fluid melt resulted. Next the resultant molten glaze was poured into a vessel containing cold water and shattered into small particules. Then the particles were ground in an alumina ball mill until small enough to pass through a 325 mesh screen. Thereafter, the particles were ground an additional four hours in a spraying vehicle to provide a fineness suitable for spray deposition upon a high density alumina substrate. A spray composition was then prepared containing 100.0 grams of glass frit, 32.5 grams of methyl methacrylate dissolved in ethylene glycol monoethylether acetate, a binder which serves to hold the unfired glaze on the substrate, and 67.5 grams of ethylene glycol monoethylether acetate. Spraying was effected by means of a conventional spray gun, approximately 75 milligrams per square inch being deposited upon a 96 percent, by weight, alumina substrate. Finally, the sprayed substrates were fired at the noted temperatures for the specified time periods indicated in Table III.

TABLE II (BATCH COMPOSITION)

|  | Example 1 | Example 2 | Example 3 |
|---|---|---|---|
| $Al_2O_3$ | 8.0 | 8.0 | 8.0 |
| $SiO_2$ | 41.0 | 40.0 | 40.0 |
| $CaCO_3$ | 8.93 | 8.9 | 14.28 |
| $BaCO_3$ | 19.31 | 6.5 | 10.3 |
| $H_3BO_3$ | 8.88 | 17.8 | 8.88 |
| PbO | 15.0 | 18.0 | 22.0 |
| $Bi(NO_3)_3 \cdot 5H_2O$ | 16.64 | 20.8 | 10.4 |
| $TiO_2$ | 1.0 | 2.0 | 2.0 |
| $K_2CO_3$ | 2.93 | 2.93 | 2.93 |
| $As_2O_3$ | 0.5 | 0.5 | 0.5 |

TABLE II-A

|  | Example 1 | Example 2 | Example 3 |
|---|---|---|---|
| $Al_2O_3$ | 8 | 8 | 8 |
| $SiO_2$ | 41 | 40 | 40 |
| CaO | 5 | 5 | 8 |
| BaO | 15 | 5 | 8 |
| $B_2O_3$ | 5 | 10 | 5 |
| PbO | 15 | 18 | 22 |
| $Bi_2O_3$ | 8 | 10 | 5 |
| $TiO_2$ | 1 | 2 | 2 |
| $K_2O$ | 2 | 2 | 2 |
| $As_2O_3$ | 0.5 | 0.5 | 0.5 |

TABLE III

| Glaze | Firing Temp. ° C. | Firing Time (min.) | Acid resistance | Anodization test time to reach 200 volts (min.) | Insulation resistance ohms (250° C.) |
|---|---|---|---|---|---|
| Ex. 1 | 1,200 | 20 | "AA" | 40 | $2 \times 10^{10}$ |
| Ex. 2 | 1,080 | 30 | "AA" | 43 | $2 \times 10^{10}$ |
| Ex. 3 | 1,200 | 20 | "AA" | 44½ | $2 \times 10^{10}$ |
| Prior art glaze #1 |  |  | "A" | (¹) | $2 \times 10^9$ |
| Prior art glaze #2 |  |  | "AA" | (²) | $2 \times 10^8$ |

¹ Leveled off at 110–120 volts.
² Leveled off at 190–200 volts in 60 minutes.

Acid resistance, voltage capability and insulation resistance for the described compositions were next determined by conventional techniques. More specifically, acid resistance was determined by the Porcelain Enamel Institute Acid Resistance Test (Bulletin T-21), voltage capability (the time required to reach 200 volts) by immersion in a 0.01 percent citric acid solution of an aluminoborosilicate glass substrate bearing coating of tantalum and a high density alumina substrate coated with the novel glaze, the tantalum being anodized at 0.25 milliamperes cm.$^{-2}$ to 200 volts, and insulation resistance by measuring the resistance cross a 0.01 inch by 30.0 inch strip of the glazed substrate. For comparative purposes, the prior art glazes were deposited by the described technique upon the noted substrates. The compositions of these prior art glazes, obtained from commercial sources, were approximately as shown in Table IV.

TABLE IV

|  | Prior art glaze #1, (wt. percent) | Prior art glaze #2, (wt. percent) |
| --- | --- | --- |
| $SiO_2$ | 43 | 51 |
| $Al_2O_3$ | 8 | 11 |
| $B_2O_3$ | 10 | 6 |
| CaO | 15 | 8 |
| PbO | 21 | 21 |
| $K_2O$ | 1 | 2 |
| $Na_2O$ | 2 | 1 |

It will be noted that the compositions of the invention evidence a significant improvement in voltage capability as well as enhanced insulation resistance and, in one case, superior acid resistance as compared with the prior art glaze (see Table III).

What is claimed is:

1. A ceramic substrate glaze consisting essentially of the following components in the amounts indicated:

| | Percent by wt. |
| --- | --- |
| $Al_2O_3$ | 4–10 |
| $SiO_2$ | 38–43 |
| BaO | 5–18 |
| PbO | 13–22 |
| $Bi_2O_3$ | 5–15 |
| $TiO_2$ | 0.5–2 |
| $K_2O$ | 0.5–2 |
| $As_2O_3$ | 0.25–1 | and at least one member selected from the group consisting of CaO and $B_2O_3$ in amounts ranging from 0–10 percent by weight.

2. A ceramic substrate glaze in accordance with claim 1 including

| | Percent by weight |
| --- | --- |
| $Al_2O_3$ | 8 |
| $SiO_2$ | 41 |
| BaO | 15 |
| PbO | 15 |
| $TiO_2$ | 1 |
| $As_2O_3$ | 0.5 |
| CaO | 5 |
| $B_2O_3$ | 5 |
| $Bi_2O_3$ | 8 |
| $K_2O$ | 2 |

3. A ceramic substrate in accordance with claim 1 including

| | Percent by wt. |
| --- | --- |
| $Al_2O_3$ | 8 |
| $SiO_2$ | 40 |
| CaO | 5 |
| BaO | 5 |
| $B_2O_3$ | 10 |
| PbO | 18 |
| $Bi_2O_3$ | 10 |
| $TiO_2$ | 2 |
| $K_2O$ | 2 |
| $As_2O_3$ | 0.5 |

4. A ceramic substrate glaze in accordance with claim 1 including

| | Percent by wt. |
| --- | --- |
| $Al_2O_3$ | 8 |
| $SiO_2$ | 40 |
| CaO | 8 |
| BaO | 8 |
| $B_2O_3$ | 5 |
| PbO | 22 |
| $Bi_2O_3$ | 5 |
| $TiO_2$ | 2 |
| $K_2O$ | 2 |
| $As_2O_3$ | 0.5 |

5. A method for the preparation of a ceramic substrate glaze consisting essentially of the following components in the amounts indicated:

| | Percent by wt. |
| --- | --- |
| $Al_2O_3$ | 4–10 |
| $SiO_2$ | 38–43 |
| BaO | 5–18 |
| PbO | 13–22 |
| $Bi_2O_3$ | 5–15 |
| $TiO_2$ | 0.5–2 |
| $K_2O$ | 0.5–2 |
| $As_2O_3$ | 0.25–1 | and at least one member selected from the group consisting of CaO and $B_2O_3$ in amounts ranging from 0–10 percent, by weight which comprises the steps of forming a mixture of the constituent components of said glaze and heating the said mixture to a temperature within the range of 1350–1450° C. whereby there is formed a molten glass, pouring said molten glass into cold water thereby fracturing said glass into small particles, and grinding particles to a desired particles size.

References Cited

UNITED STATES PATENTS 2,508,511  5/1950  Goodman _____ 106—49 X
3,256,136  6/1966  Cole et al. _____ 106—49 X HELEN M. McCARTHY, Primary Examiner W. R. SATTERFIELD, Assistant Examiner U.S. Cl. X.R.

117—121; 106—48, 46, 53